United States Patent [19]
Dambach

[11] Patent Number: 5,870,891
[45] Date of Patent: Feb. 16, 1999

[54] METHOD FOR MONITORING THE SUPPLY OF SECONDARY AIR TO THE EXHAUST GAS OF AN INTERNAL COMBUSTION ENGINE

[75] Inventor: Dieter-Andreas Dambach, Münchingen, Germany

[73] Assignee: Robert Bosch GmbH, Stuttgart, Germany

[21] Appl. No.: 816,378

[22] Filed: Mar. 13, 1997

[30] Foreign Application Priority Data

Mar. 14, 1996 [DE] Germany .................. 196 09 922.6

[51] Int. Cl.⁶ .................................................. F01N 3/00
[52] U.S. Cl. ........................... 60/274; 60/276; 60/285
[58] Field of Search ..................... 60/274, 276, 305, 60/285

[56] References Cited

U.S. PATENT DOCUMENTS 3,827,237  8/1974  Linder et al. .................. 60/285 X
4,007,719  2/1977  Brettschneider et al. .......... 60/285 X
4,068,472  1/1978  Takata et al. .................... 60/276
4,376,369  3/1983  Horikoshi et al. ................ 60/276
4,385,491  5/1983  Sakurai et al. .................. 60/276

FOREIGN PATENT DOCUMENTS 61-79814  4/1986  Japan .

*Primary Examiner*—John E. Ryznic
*Attorney, Agent, or Firm*—Walter Ottesen

[57] ABSTRACT

The invention relates to a method for monitoring blowing in secondary air to the exhaust gas in an internal combustion engine equipped with a measuring sensor for detecting the oxygen content in the exhaust gas. The method is based on the reaction of the measuring sensor to the switch in of the secondary air. The quantity of the air inducted by the engine is increased when the secondary air is supplied to the exhaust gas.

6 Claims, 3 Drawing Sheets

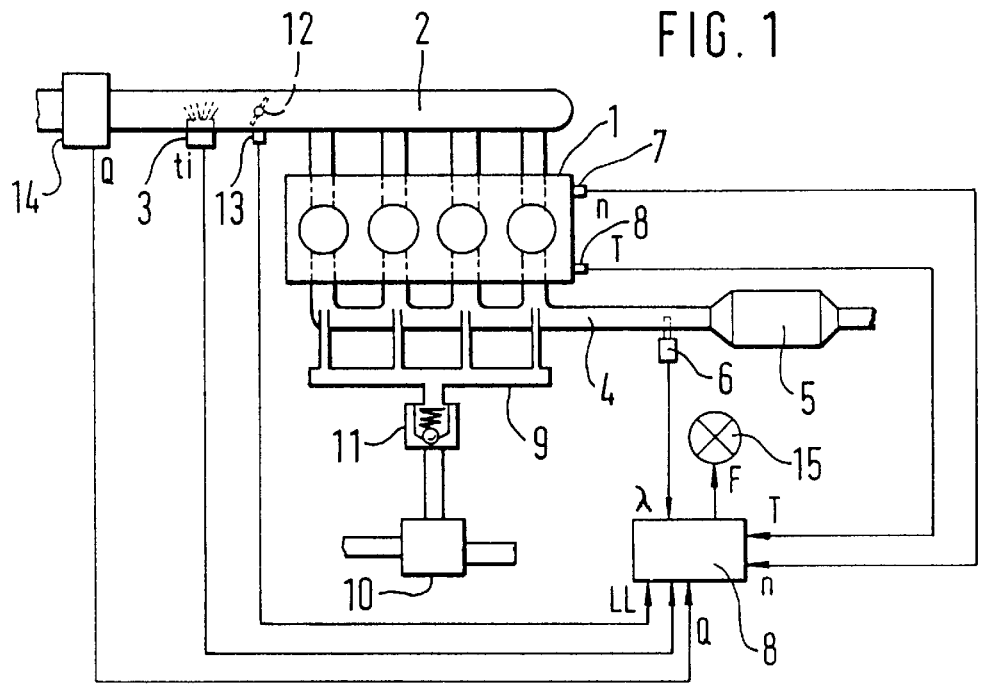

METHOD FOR MONITORING THE SUPPLY OF SECONDARY AIR TO THE EXHAUST GAS OF AN INTERNAL COMBUSTION ENGINE

FIELD OF THE INVENTION

The invention relates to a method for monitoring the supply of secondary air to the exhaust gas of an internal combustion engine having a catalytic converter.

BACKGROUND OF THE INVENTION

In the operation of internal combustion engines, air is supplied to the exhaust gas of the engine after a start. The exothermal reaction of the air, which is blown in between the outlet valves of the engine and the catalytic converter, and the hot exhaust gas and the further oxidation thereof before and in the catalytic converter leads to an accelerated warming of the catalytic converter to its operating temperature and therefore to a reduction of the emission of toxic substances in the warm-up phase of the engine.

Statutory requirements in the United States provide for monitoring systems for blowing in secondary air so that a minimum air flow is supplied.

A method and arrangement for diagnosing secondary air systems is disclosed in U.S. Pat. No. 5,444,975. According to the teaching in this patent, the reaction of the exhaust-gas probe (or of the lambda control, which is coupled to the exhaust-gas probe, for adjusting the composition of the air/fuel mixture for the engine) is evaluated as to the activation of an electrically driven secondary air pump. An intact secondary air system leads to an excess of oxygen in the exhaust gas. Especially for high capacity secondary air pumps, the problem is present that the supply of a large quantity of secondary air triggers an intense enrichment of the air/fuel mixture by the lambda control loop. The quantity of the emitted toxic substances then increases dramatically because the engine burns a very rich mixture. The running performance of the engine can, under some circumstances, deteriorate significantly. In order to keep these disadvantages at a minimum, the known method provides for an adaptation of the supplied secondary-air quantity to the value of the exhaust-gas quantity, which is supplied by the engine, by varying the pumping capacity of the secondary-air pump. For this purpose, means are provided which make it possible to drive the secondary-air pump in at least two stages in dependence upon operating parameters of the engine.

SUMMARY OF THE INVENTION

It is an object of the invention to provide a method for diagnosing the secondary-air pump. It is another object of the invention to provide such a method which avoids the above-mentioned problems of intense enrichment by the lambda control loop and/or a deterioration of the running performance of the engine. It is still another object of the invention to carry out this method without means for varying the pumping capacity of the secondary-air pump.

The method of the invention is a method for monitoring a system for supplying secondary air to the exhaust gas of an internal combustion engine. The method includes the steps of: supplying the secondary air to the exhaust gas of the engine; providing a sensor for detecting the oxygen content of the exhaust gas and obtaining a reaction to the supply of the secondary air to the exhaust gas; and, increasing the quantity of air inducted by the engine when the secondary air is supplied to the exhaust gas.

An essential feature of the invention is that the adaptation of the secondary-air flow to the exhaust-gas quantity is not achieved by varying the secondary-air flow; instead this adaptation is achieved by varying the quantity of exhaust gas. In a preferred embodiment of the invention, the engine load is increased by retarding the ignition whereby the portion of the secondary air in the total exhaust-gas quantity is reduced. With the method of the invention, the lambda change by the lambda control loop is significantly reduced. This lambda change is to be expected as a reaction to an activation of the secondary-air pump. As a consequence, the increase of the exhaust-gas emission and the possible deterioration of the running performance of the engine are significantly reduced.

In this way, the method of the invention makes it possible to monitor the supply of secondary air even for large pump capacities without additional components and without additional sensors.

BRIEF DESCRIPTION OF THE DRAWINGS

The invention will now be described with reference to the drawings wherein:

FIG. 1 is a schematic of an internal combustion engine having a secondary-air pump, a control apparatus as well as additional components thereby showing the technical background in which the method of the invention is applied;

FIG. 2 is a schematic showing the assembly and the operation of the control apparatus;

DESCRIPTION OF THE PREFERRED EMBODIMENTS OF THE INVENTION

Figure 3:
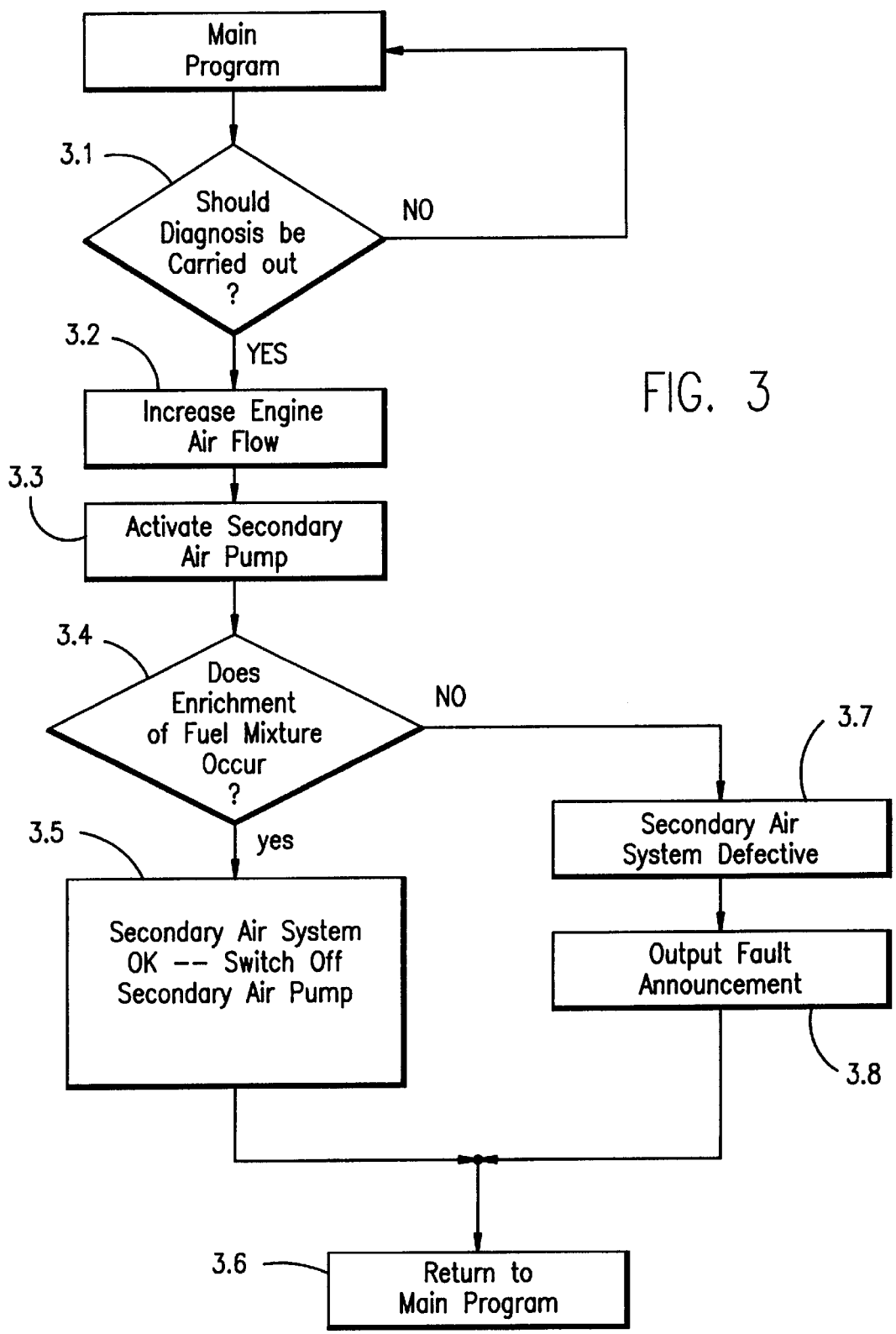
FIG. 3 is a flowchart showing an embodiment of the method of the invention; and, FIG. 4a, FIG. 4b and FIG. 4c disclose different embodiments of a step of the flowchart of FIG. 3 which is significant for the invention.

FIG. 1 shows an arrangement which includes: an internal combustion engine 1, an intake pipe 2, fuel-metering means 3 and an exhaust-gas pipe 4 provided with a catalytic converter 5 and an exhaust-gas probe 6, a sensor 7 for detecting the engine rpm (n), a sensor 8 for detecting the temperature T of the engine, a control apparatus 8, lines 9 for supplying secondary air into the exhaust-gas pipe, a secondary-air pump 10, a check valve 11, a throttle flap 12 having an idle contact 13, means 14 for detecting the air quantity Q inducted by the engine and means 15 for displaying or storing a signal which indicates a fault in the operation of the secondary-air pump.

The control apparatus 8 receives at least signals Q as to the quantity of the air inducted, the rpm (n), the temperature T of the engine, the position LL of the throttle flap as well as the instantaneous air/fuel mixture composition λ. From a portion of these signals, the control apparatus forms a fuel-metering signal, such as an injection time ti for driving the fuel-metering means 3. The formation of the fuel-metering signal takes place controlled or via a lambda control. Likewise, the adjustment of the idle rpm is open-loop controlled or closed-loop controlled. The positioning intervention (for example, on the throttle flap or on an idle actuator) can be undertaken in a bypass to the throttle flap.

The air/fuel mixture formed in the intake pipe 2 is combusted in the engine 1. The residual oxygen portion of the exhaust gas of this combustion process is detected by the exhaust-gas probe 6 and toxic substances present in the exhaust gas are converted in the catalytic converter 5.

In specific operating states, secondary air is supplied to the exhaust gas of the engine via the secondary-air pump 10. The secondary-air pump 10 is driven by the control apparatus 8, for example, in dependence upon the signal LL indicative of the position of the throttle flap and additional signals as to load, rpm and temperature of the engine. If a fault in the secondary-air supply is determined when carrying out the diagnostic method, the control apparatus stores the occurrence of the fault for later inquiry and supplies a corresponding signal F to the means 15 which indicates and stores the fault. The check valve 11 prevents the exhaust gas from reaching the ambient via the secondary-air pump 10.

FIG. 2 shows a known control apparatus 8 in the form of function blocks. The signals (Q, T, λ, LL, n) of the sensors of FIG. 1 are supplied to the input block 17. An output block 18 outputs, for example, the following: a fuel-metering signal ti, a signal S for driving the secondary-air pump and, if required, the fault signal F. A computer unit 19 arbitrates between the two blocks in accordance with a program which can be stored in memory 20. In addition, the memory 20 can hold data which can be used for the operation of the engine and this data includes, for example, data fields for injection times or ignition time points as well as information as to detected malfunctions of the system.

FIG. 3 shows a flowchart of an embodiment of the method of the invention. Step 3.1 is reached from a higher-order main program. In step 3.1, a check is first made as to whether certain conditions are satisfied under which the diagnosis is to be carried out. A check can, for example, be made as to whether the engine is operationally warm and whether the engine is at idle or in the part-load range. If these conditions are not satisfied, the diagnosis is not carried out and processing continues with the higher-order main program.

If, in contrast, the inquiry step 3.1 is answered in the affirmative, then the program branches to the step s3.2 which is essential to the invention. In step s3.2, the engine air flow is increased. Thereafter, in step 3.3, the secondary-air pump is activated. When the secondary-air system is intact, the oxygen content in the exhaust gas increases so that the exhaust-gas measuring probe signals a λ>1 whereupon the lambda control enriches the fuel mixture. In step 3.4, a check is made to determine as to whether this is the case. An enrichment manifests itself, for example, in that the exhaust-gas probe supplies a value corresponding to λ>1 or that the corrective value of the lambda control exceeds a pregiven threshold. The lambda control, for example, corrects a base metering signal formed in dependence upon load and rpm. If this inquiry step is answered in the affirmative, then the secondary-air system is deemed to be in order and the secondary-air pump is switched off in step s3.5 and there is a return to the main program with step s3.6.

If, in contrast, the inquiry in step 3.4 is answered in the negative, this is then an indication that an insufficient excess of oxygen is present in the exhaust gas which, in turn, indicates a defective secondary-air system (step s3.7). Thereafter, in step 3.8 a fault announcement is outputted and there is a return to the main program.

Figure 4A:
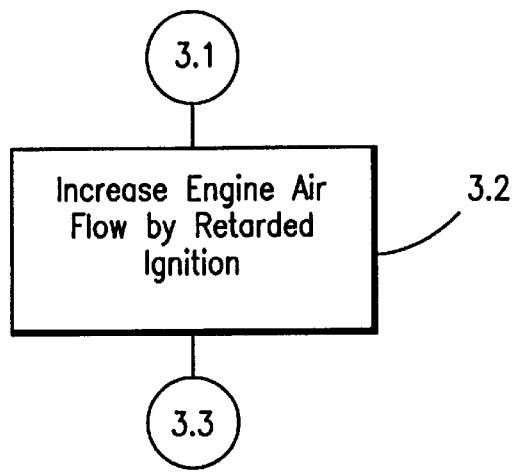
Figure 4B:
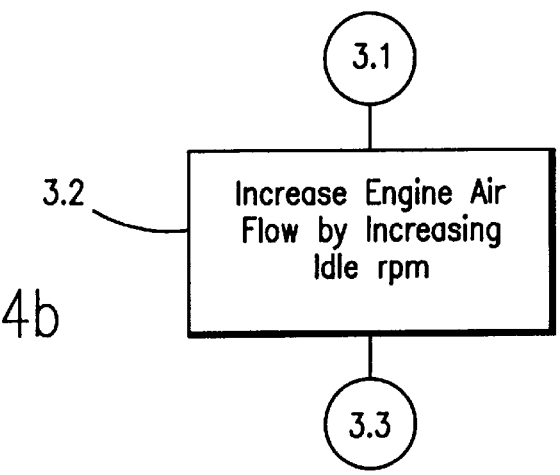

FIGS. 4*a* and 4*b* show different embodiments of the step 3.2 of FIG. 3 which is essential to the invention.

According to FIG. 4*a*, the engine air flow is increased by shifting the ignition in the retard direction. The shift of the ignition in the retard direction effects a reduction of the torque developed by the engine. A tendency to reduce rpm is caused thereby and is compensated by the idle control in that an idle actuator, for example, opens the throttle flap farther. In this way, the air quantity inducted by the engine is increased as a consequence of the shift of the ignition in the retard direction.

Another possibility of increasing the engine air flow is presented in FIG. 4*b*. In the context of this alternative, the engine air flow is increased by increasing the idle rpm.

Figure 4C:
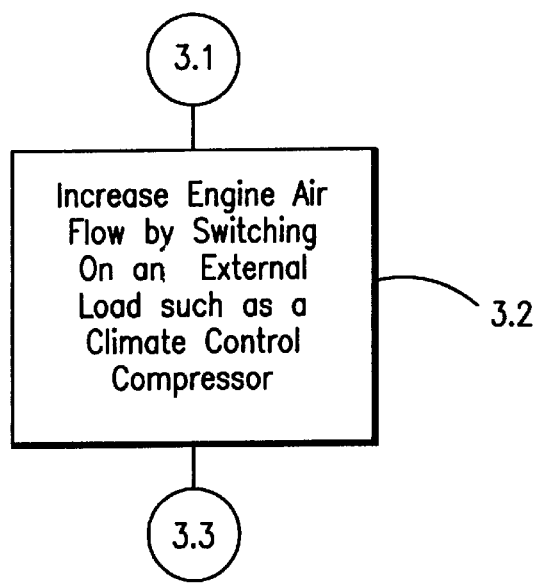

A further possibility of increasing the engine air flow is presented in FIG. 4*c* and comprises switching on external loads such as a compressor of a climate control system. In order to manage such additional load without a break in the rpm, the engine air flow must likewise be increased, for example, by switching on a disturbance variable in the idle control.

It is understood that the foregoing description is that of the preferred embodiments of the invention and that various changes and modifications may be made thereto without departing from the spirit and scope of the invention as defined in the appended claims.

What is claimed is:

1. A method for monitoring a system for supplying secondary air to the exhaust gas of an internal combustion engine, the method comprising the steps of:

supplying the secondary air to the exhaust gas of the engine;

providing a sensor for detecting the oxygen content of the exhaust gas and obtaining a reaction to the supply of the secondary air to the exhaust gas; and, increasing the quantity of air inducted by the engine when the secondary air is supplied to the exhaust gas.

2. The method of claim 1, wherein said quantity of air inducted by the engine is increased by increasing the engine load by retarding ignition in combination with the opening of the throttle flap.

3. The method of claim 1, wherein said quantity of air inducted by the engine is increased by increasing the engine load by retarding ignition in combination with the opening of a bypass channel.

4. The method of claim 1, wherein said quantity of air inducted by the engine is increased by increasing the idle rpm of said engine.

5. The method of claim 1, wherein said quantity of air inducted by the engine is increased by switching on an additional load.

6. The method of claim 5, wherein said additional load is a compressor of a climate control system.

* * * * *